(12) United States Patent
Kobayashi et al.

(10) Patent No.: US 6,550,868 B2
(45) Date of Patent: Apr. 22, 2003

(54) DAMPER PLATE FOR AUTOMOBILE WHEEL

(75) Inventors: Yuichi Kobayashi, Hiratsuka (JP); Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/006,702

(22) Filed: Dec. 10, 2001

(65) Prior Publication Data

US 2002/0070603 A1 Jun. 13, 2002

(30) Foreign Application Priority Data

Dec. 12, 2000 (JP) ........................................ 2000-377109

(51) Int. Cl.[7] .............................. E04B 1/82; B60B 19/00
(52) U.S. Cl. ............................. 301/6.91; 295/7; 74/443; 181/290
(58) Field of Search ............................. 295/7; 301/6.91, 301/35.621, 35.629; 74/443; 181/207, 291, 290

(56) References Cited

U.S. PATENT DOCUMENTS

| | | | | | |
|---|---|---|---|---|---|
| 1,818,447 | A | * | 8/1931 | Baker | 301/6.91 |
| 4,183,572 | A | * | 1/1980 | Albrecht et al. | 295/7 |
| 4,392,681 | A | * | 7/1983 | Raquet | 295/7 |
| 5,454,628 | A | * | 10/1995 | Maiworm et al. | 301/6.91 X |
| 5,734,133 | A | * | 3/1998 | Mayer et al. | 181/208 |
| 6,055,140 | A | * | 4/2000 | Marchon | 360/135 |
| 6,177,173 | B1 | * | 1/2001 | Nelson | 428/137 |

* cited by examiner

Primary Examiner—Russell D. Stormer
(74) Attorney, Agent, or Firm—Rader, Fishman & Grauer PLLC

(57) ABSTRACT

A damper plate for an automobile wheel by which ride comfort and interior noise characteristics are improved without seriously deteriorating driving stability or unfastening nuts. The damper plate has a structure in which a metal plate and a buffer member are laminated and is inserted between the automobile wheel and an axle.

13 Claims, 3 Drawing Sheets

DAMPER PLATE FOR AUTOMOBILE WHEEL

BACKGROUND OF THE INVENTION

1. Field of the Invention

The present invention relates to a damper plate for an automobile wheel, and more particularly to a damper plate for an automobile wheel by which ride comfort and interior noise characteristics are improved.

2. Description of the Related Art

There has been hitherto proposed a damper plate for an automobile wheel, for example, made of rubber or synthetic resin as disclosed in Japanese utility model application Kokai publication No. 59-83102. Such a damper plate is interposed between the wheel and an axle, so that vibrations transmitted from the wheel to a vehicle body are suppressed and ride comfort and interior noise characteristics are improved.

However, when the damper plate for the automobile wheel made of an elastic material as described above is interposed between the wheel and the axle, driving stability is significantly deteriorated. Further, nuts which connect and secure the wheels to the axle are apt to be unfastened during traveling. Accordingly, it has been difficult to put the above-described damper plate for the automobile wheel to practical use.

SUMMARY OF THE INVENTION

An object of the present invention is to provide a damper plate for an automobile wheel capable of improving ride comfort and interior noise characteristics without significantly deteriorating driving stability and unfastening nuts.

For achieving the above-described object, a damper plate for an automobile wheel according to the present invention is characterized in that a metal plate and a buffer member are laminated, more preferably, a plurality of layers of metal plates and a plurality of layers of buffer members are alternately laminated.

With adopting a structure in which the metal plates and the buffer members are laminated as described above, the rigidity of the damper plate can be increased higher than that of a conventional damper plate composed only of an elastic material. Therefore, when the damper plate is interposed between the wheel and the axle, vibrations transmitted from the wheel to the vehicle body can be suppressed by the buffer members, without significantly deteriorating the driving stability and with maintaining the fastening torque of the nuts stable. As a result, the ride comfort and interior noise characteristics can be improved.

In the present invention, a rubber composition or synthetic resin may be employed as the buffer member. Further, a setting of the rigidity corresponding to desired vehicle characteristics can be arranged if a plurality of buffer areas composed of respectively different materials are provided in the buffer member, if the materials of the buffer members are different mutually among the layers, if the materials of the metal plates are different mutually among the layers, and further if rigid members having the equal thickness as that of the buffer member are embedded in the buffer members.

DETAILED DESCRIPTION OF THE PREFERRED EMBODIMENTS

Now, a constitution of the present invention will be described in detail by referring to the accompanying drawings.

Figure 1:
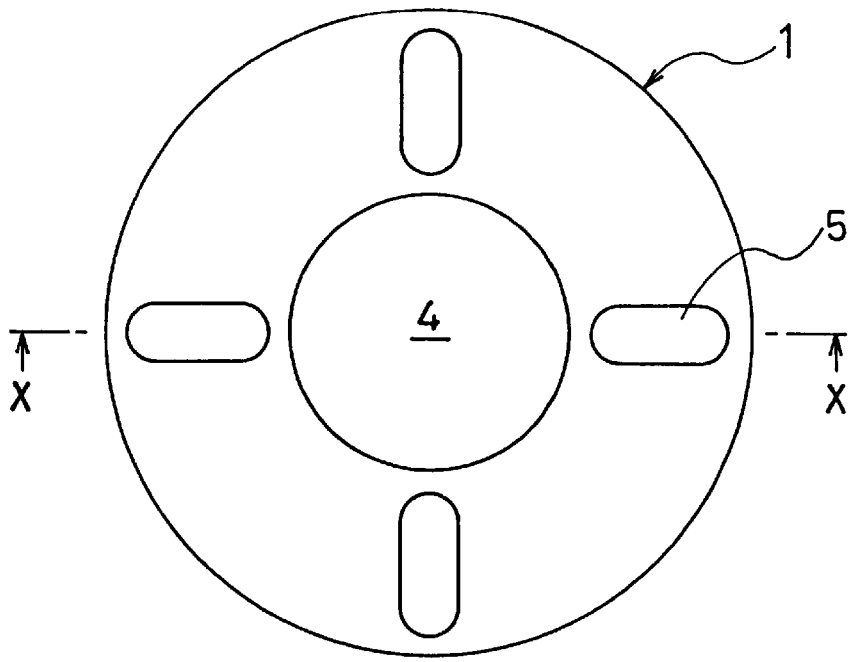
FIG. 1 is a front view showing a damper plate for an automobile wheel according to one embodiment of the present invention.
Figure 2:
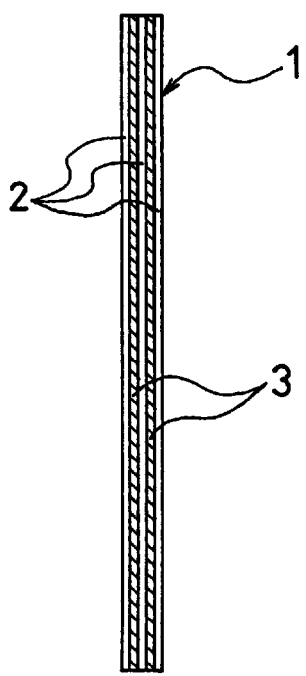
FIG. 2 is a side view of the damper plate shown in FIG. 1.
Figure 3:
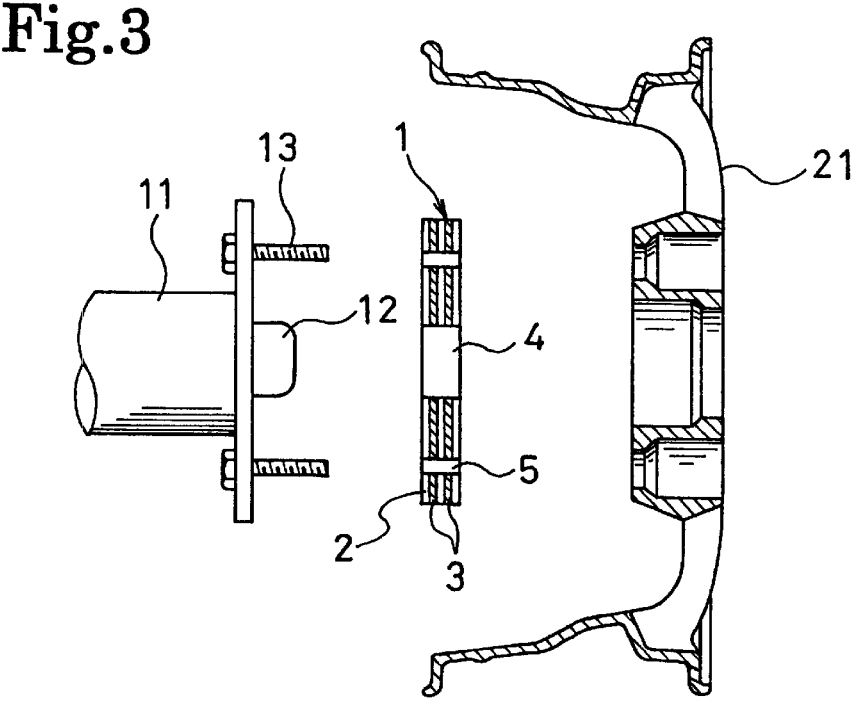
FIG. 3 is an explanatory view showing a state before the damper plate shown in section taken along a line X—X in FIG. 1 is fixed between an axle and an automobile wheel.

FIGS. 1 to 3 show an embodiment of a damper plate for an automobile wheel according to the present invention. The damper plate 1 has a disk structure in that a plurality of disk-shaped metal plates 2 and a plurality of disk-shaped buffer members 3 made of a rubber composition are alternately laminated, vulcanized and bonded together. The damper plate shown in the figures has three layers of the metal plates 2 and two layers of the buffer members 3. In the central part of the damper plate 1, a circular hub hole 4 into which a hub shaft 12 on an axle 11 is inserted is formed. On the periphery of the hub hole 4, elliptic bolt holes 5 into which bolts 13 on the axle 11 for attaching a wheel 21 to the axle are inserted are provided at four positions respectively spaced at equal intervals. Each buffer member 3 is composed of a rubber composition of the same kind having an equal hardness.

When the wheel 21 is attached to the axle 11 by screwing nuts (not shown) onto the bolts 13, the damper plate 1 is fixed so as to be interposed between the axle 11 and the wheel 21. In this case, since the damper plate 1 has the structure in which the metal plates 2 and the buffer members 3 are laminated, as mentioned above, the rigidity of the damper plate 1 can be increased higher than that of a damper plate composed only of elastic material in the prior art. Therefore, vibrations transmitted from the wheel 21 to the axle 11 are suppressed by the buffer members 3 without significantly deteriorating driving stability and unfastening the nuts, so that ride comfort and interior noise characteristics can be improved.

Figure 4:
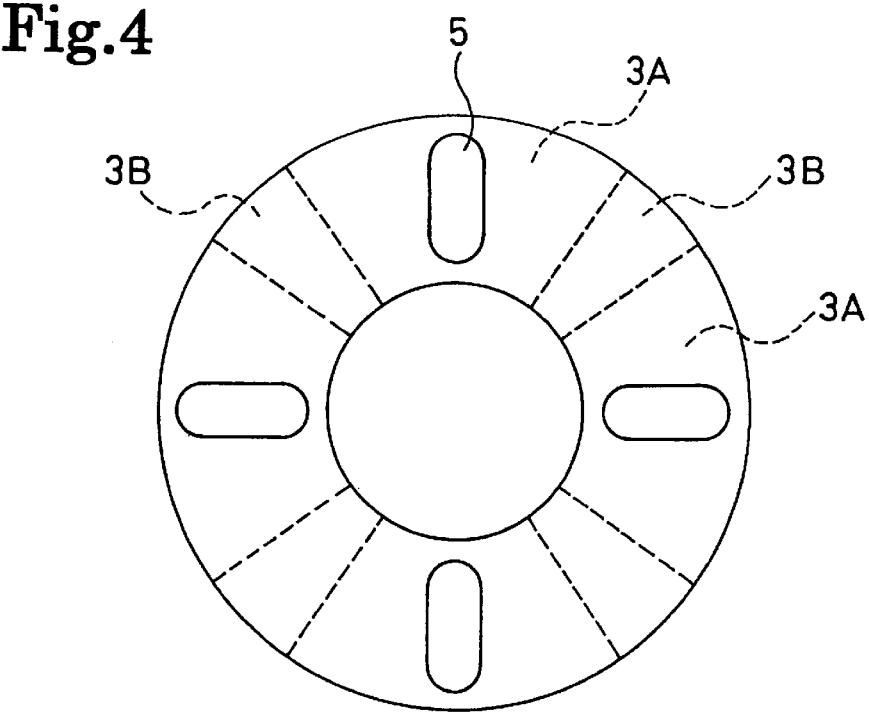
FIG. 4 is a front view showing a damper plate for an automobile wheel according to another embodiment of the present invention.

FIG. 4 shows another embodiment of a damper plate for an automobile wheel according to the present invention. In this damper plate, a plurality of buffer areas 3A and 3B made of different kinds of rubber compositions having unequal hardnesses are provided in a buffer member 3. Referring to the drawing, the buffer areas 3A are arranged in sections where bolt holes 5 are located and the buffer areas 3B are arranged therebetween.

When the buffer areas 3A are composed of the rubber composition having high hardness, the rigidity of the parts attached to bolts 13 can be enhanced. Thus, the driving stability can be more improved. On the other hand, when the buffer areas 3A are composed of the rubber composition having low hardness, the rigidity of the parts attached to the bolts 13 can be reduced. Therefore, the ride comfort and the interior noise characteristics can be more improved. According to this embodiment, the balance in improvements between the driving stability, and the ride comfort and the interior noise characteristics can be properly selected as required, which makes it possible to arrange a setting of the rigidity corresponding to desired vehicle characteristics.

Figure 5:
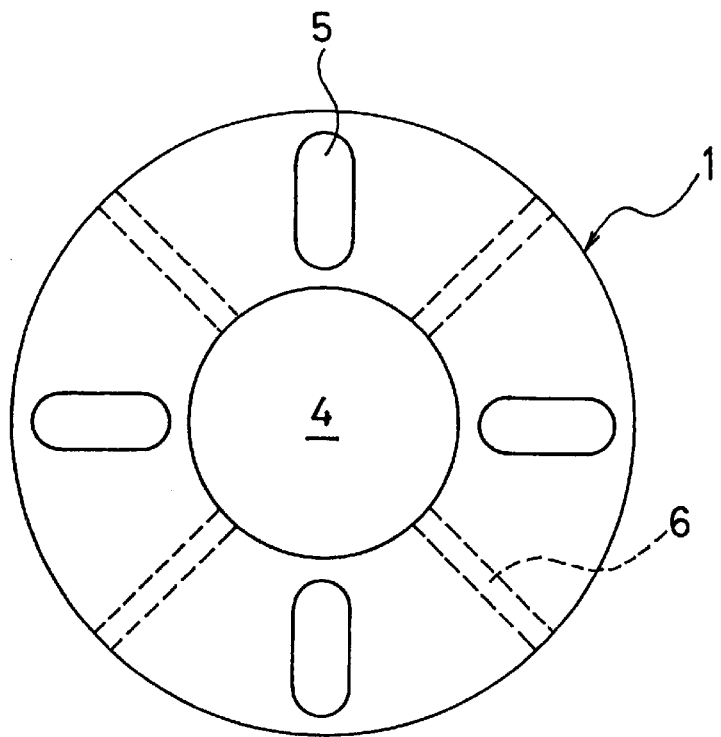
FIG. 5 is a front view showing a damper plate for an automobile wheel according to a still another embodiment of the present invention.
Figure 6:
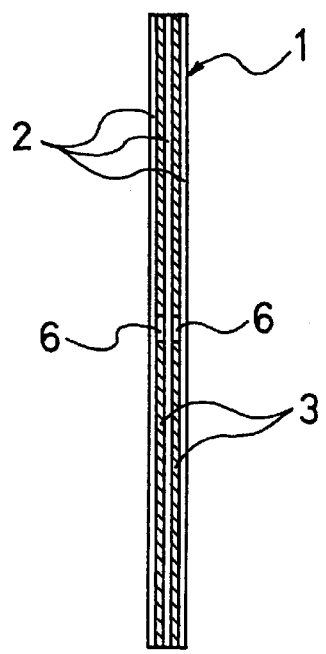
FIG. 6 is a side view of the damper plate shown in FIG. 5.

FIGS. 5 and 6 show a still another embodiment of a damper plate for an automobile wheel according to the present invention. In this damper plate, rigid members 6 made of metal or the like and having the equal thickness as that of a buffer member 3 are embedded in the buffer member 3. A plurality of thin plate-shaped rigid members 6 are arranged at equal intervals so as to be extended from an inner edge of the damper plate 1 to an outer edge thereof.

Since the rigid members 6 are provided as mentioned above, the unvulcanized rubber compositions of the buffer members 3 can be prevented from flowing out of the damper plate 1 when metal plates 2 and the buffer members 3 are vulcanized and bonded together, and dimensional accuracy can be improved, and further, a buffer function of the damper plate 1 can be adjusted. The rigid members 6 may be provided in the buffer members 3 having a plurality of buffer areas 3A and 3B as shown in FIG. 4.

In the present invention, the metal plates 2 may be composed of any metal. For example, steel or aluminum or the like may be preferably employed. A plurality of layers of metal plates 2 may be composed of metal plates of the same kind or different kinds. Further, the metal plates may have the equal thickness or unequal thicknesses and may be properly selected so as to allow the rigidity to correspond to desired vehicle characteristics.

Further, a plurality of layers of buffer members 3 may be composed of different kinds of buffer materials having unequal hardnesses for respective layers, and may have unequal thicknesses for respective layers. Accordingly, the materials or thickness of the buffer members 3 may be suitably selected so as to realize a buffer function corresponding to the desired vehicle characteristics. Difference of the kinds of materials of the buffer members among a plurality of layers makes it possible to suppress vibrations in a wide range of frequency.

As the rubber composition used for the above-described buffer members, may be desirably employed a rubber composition having a loss tangent tan $\delta$ of 0.08 or more, preferably 0.15 or more, which is measured by using a dynamic viscoelasticity measuring device, produced by Toyo Seiki Seisaku-sho, Ltd., under the conditions of the frequency of 20 Hz, the temperature of 60° C., the initial distortion of 10% and the amplitude of ±2%. If the loss tangent tan $\delta$ is smaller than 0.08, it will be difficult to effectively suppress the vibrations transmitted from the wheel 21 to the axle 11. The buffer members may be composed of a material with elasticity such as synthetic resin in place of the above-described rubber composition.

Further, the metal plates 2 and the buffer members 3 may be bonded together by an adhesive or mechanical means such as bolts and nuts.

When the fact that the damper plate is sandwiched between the axle 11 and the wheel 21 is taken into consideration, the thickness of the damper plate 1 is preferably set to about 2 to 10 mm. By setting the damper plate to such a thickness, a special improvement does not need to be given to a vehicle, so that the damper plate is excellent in its generalization for ordinary automobiles.

According to the present invention, since the damper plate for an automobile wheel is formed by combinedly laminating the metal plates and the buffer members, the ride comfort and the interior noise characteristics can be improved without significantly deteriorating the driving stability and unfastening the nuts.

Although the preferred embodiments of the present invention are specifically described above, it is to be understood that various kinds of modifications, substitutions and replacements may be performed thereto without departing the spirit and scope of the present invention defined by the attached claims.

What is claimed is:

1. A damper plate for an automobile wheel and an automobile wheel axle, comprising:
   a metal plate and a buffer member which are laminated, wherein the laminated metal plate and the buffer member are interposed between the automobile wheel and the automobile wheel axle.

2. A damper plate according to claim 1, wherein said buffer member is composed of a rubber composition of which a loss tangent tan $\delta$ is 0.08 or more.

3. A damper plate for an automobile wheel and an automobile wheel axle, comprising:
   a plurality of layers of metal plates and a plurality of layers of buffer members which are alternately laminated, wherein the alternately laminate plurality of layers of metal plates and the plurality of layers of buffer members are interposed between the automobile wheel and the automobile wheel axle.

4. A damper plate for an automobile wheel comprising:
   a metal plate and a buffer member which are laminated, wherein a plurality of buffer areas, each being made of a different material from each other, are provided in said buffer member.

5. A damper plate for an automobile wheel comprising:
   a plurality of layers of metal plates and a plurality of layers of buffer members which are alternately laminated, wherein a plurality of buffer areas, each being made of a different material from each other, are provided in said buffer members.

6. A damper plate for an automobile wheel comprising:
   a plurality of layers of metal plates and a plurality of layers of buffer members which are alternately laminated, wherein the materials of said buffer members are mutually different among the layers.

7. A damper plate for an automobile comprising:
   a plurality of layers of metal plates and a plurality of layers of buffer members which are alternately laminated, wherein the materials of said metal plates are mutually different among the layers.

8. A damper plate for an automobile wheel comprising:
   a metal plate and a buffer member which are laminated, wherein rigid members having an equal thickness as that of said buffer member are embedded in said buffer member.

9. A damper plate for an automobile comprising:
   a plurality of layers of metal plates and a plurality of layers of buffer members which are alternately laminated, wherein rigid members having an equal thickness as that of said buffer members are embedded in said buffer members.

10. A damper plate for an automobile wheel according to any one of claims 2, 4, 5 and 6, wherein said buffer members are composed of a rubber composition of which loss tangent tan $\delta$ is 0.08 or more.

11. A damper plate for an automobile wheel according to claim 4, wherein rigid members having an equal thickness as that of said buffer member are embedded in said buffer member.

12. A damper plate for an automobile wheel according to claim 4, wherein said buffer member is composed of a rubber composition of which loss tangent tan $\delta$ is 0.08 or more.

13. A damper plate for an automobile wheel according to any one of claims 5, 6 and 7, wherein rigid members having an equal thickness as that of said buffer members are embedded in said buffer members.

* * * * *